F. READING, Jr.
GATE.
APPLICATION FILED MAR. 11, 1921. RENEWED FEB. 7, 1922.
1,409,468.
Patented Mar. 14, 1922.
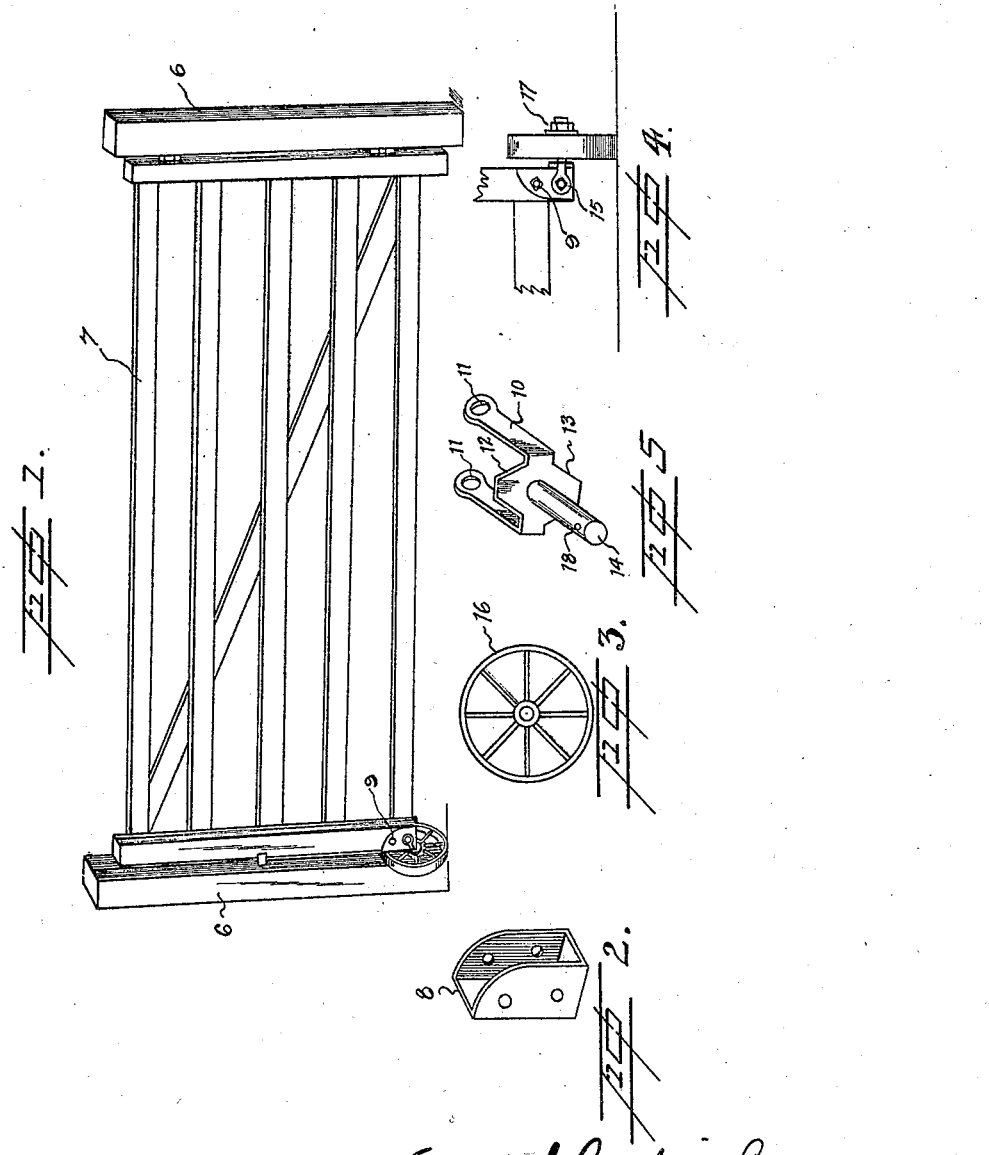

UNITED STATES PATENT OFFICE.

FREDERICK READING, JR., OF PRINCETON, ONTARIO, CANADA.

GATE.

1,409,468. Specification of Letters Patent. Patented Mar. 14, 1922.

Application filed March 11, 1921, Serial No. 451,623. Renewed February 7, 1922. Serial No. 534,815.

*To all whom it may concern:*

Be it known that I, FREDERICK READING, Jr., a citizen of the Dominion of Canada, residing at Princeton, in the county of Oxford and Province of Ontario, have invented certain new and useful Improvements in Gates, of which the following is a specification.

This invention relates to improvements in gates and one which is designed to overcome the undesirable feature which is common to practically all gates, that of sagging at the free end.

The object of my invention is to provide a shield for the outer end of a gate and a means of supporting a wheel in combination with this shield.

With these and other objects in view, the invention consists in the construction, combination and arrangement of parts as will be hereinafter fully described, illustrated in the accompanying drawings, and pointed out in the claims hereunto appended.

Fig. 1 is a perspective view of my invention.

Fig. 2 is a perspective view of the shield.

Fig. 3 is a side elevation of the wheel.

Fig. 4 is a fragmental side view of the gate with the wheel in position.

Fig. 5 is a perspective view of the wheel supporting means.

Referring to the drawings like numerals designate like parts in the various drawings.

The numeral 6 indicates side posts of a gate opening, the gate 7 being hingedly connected to one of these. The common objectionable feature of gates of this type is that on account of their length they may begin to sag or pull the post to which they are hingedly connected, to a bent position. It is then very hard to open or shut the gate as the outer free end generally drags on the ground.

The upright at the outer free end of the gate is provided with a shield 8, which shield is suitably attached to the gate by a bolt 9.

10 is a U-shaped member having its ends provided with annular openings 11. The opposite end of member 10 is provided with oppositely extending lugs 12 and 13. Centrally of this end an axle 14 is positioned to extend outwardly therefrom, as illustrated in Fig. 5. This U-shaped member is positioned so that its bifurcated portion fits over the shield as indicated in Figs. 1 and 4. Bolt 15 extends through the openings 11, the shield 8, and the lower outer corner of the gate to hold the member 10 in tightened position against the outer face of the shield.

By having the lugs 12 and 13, the wheel hereinafter mentioned will be held perpendicular to the outer side of the shield member of the gate.

A wheel 16 is positioned on an axle 14 and held thereon by a nut 17 or by means of a pin which may be extended through an opening 18, as will be seen in the drawings. The wheel 16 is carried by the free end of the gate and at right angles thereto in such manner that it will at all times support said free end of the gate.

From the foregoing it is thought that the construction of my invention will be clearly understood, and, therefore, a more extended explanation has been omitted.

What I claim as new is:

1. In combination with a gate, a shield fitted over the lower end of the outer upright of said gate, means for holding said shield to said upright, a U-shaped member, annular openings in the ends of said U-shaped member, oppositely extending lugs from the opposite end of said U-shaped member, an axle extending outwardly and centrally from the last said end, a wheel with means of retaining said wheel thereon and means for holding said U-shaped member tightly against the outer face of said shield.

2. In combination with a gate, of a shield fitted over the lower end of the front member of said gate, an axle, a bifurcated end on said axle, openings in said bifurcated end, a bolt to hold said bifurcated end tightly to the outer face of said shield, a wheel mounted on said axle and means for holding the axle in perpendicular relation to the free end of the gate.

In testimony whereof I affix my signature in the presence of two witnesses.

FREDERICK READING, JR.

Witnesses:
S. SMOKE,
OLIVER KENNEDY.